United States Patent [19]
Kotzin et al.

[11] Patent Number: 5,408,495
[45] Date of Patent: Apr. 18, 1995

[54] MULTIPLE CAVITY TUNING OF A TRANSMITTER OUTPUT IN A COMMUNICATION SYSTEM

[75] Inventors: Michael D. Kotzin, Buffalo Grove; Stephen L. Spear, Skokie, both of Ill.

[73] Assignee: Motorola, Inc., Schaumburg, Ill.

[21] Appl. No.: 60,121

[22] Filed: May 7, 1993

Related U.S. Application Data

[62] Division of Ser. No. 907,981, Jul. 2, 1992, Pat. No. 5,263,047.

[51] Int. Cl.$^6$ .............................................. H04L 27/30
[52] U.S. Cl. ................................. 375/202; 455/120; 455/129
[58] Field of Search ............ 375/1; 455/33.1, 101–103, 455/120, 129; 333/126; 370/69.1, 37, 38

[56] References Cited

U.S. PATENT DOCUMENTS

| | | | |
|---|---|---|---|
| 3,546,590 | 12/1970 | Covill | 455/120 |
| 4,234,965 | 11/1980 | Bickley et al. | 455/120 |
| 4,240,155 | 12/1980 | Vaughan | 370/69.1 |
| 4,694,466 | 9/1987 | Kadin | 375/1 |
| 4,704,585 | 11/1981 | Dunn | 375/1 |
| 4,761,796 | 8/1988 | Dunn et al. | 375/1 |
| 4,872,211 | 10/1989 | Chen | 333/126 |
| 4,979,170 | 12/1990 | Gilhousen et al. | 455/32 |
| 5,048,116 | 9/1991 | Schaeffer | 455/33 |
| 5,081,641 | 1/1992 | Kotzin et al. | 455/33 |
| 5,239,309 | 8/1993 | Tang et al. | 455/103 |
| 5,263,047 | 11/1993 | Kotzin et al. | 375/1 |

*Primary Examiner*—Salvatore Cangialosi
*Attorney, Agent, or Firm*—Richard A. Sonnentag; Daniel C. Crilly

[57] ABSTRACT

A base-site (304) combines baseband frequency hopping and fast-synthesizer hopping to produce an economical frequency hopping communication system (300). The base-site (304) combines the fast-synthesizer frequency hopping capability of transmitters (307–309) with baseband frequency hopping to produce a frequency hopping communication system (300) which serves the same number of subscribers served by transmitters (208–213) in a purely baseband hopping communication system (200), but with fewer transmitters (307–309). The implementation of frequency-selective cavities (312–317) having very low loss eliminates the need for wideband hybrid combiners (112–114), which in turn eliminates transmitted-signal power loss experienced in a purely fast-synthesizer frequency hopping communication system (100).

17 Claims, 2 Drawing Sheets

MULTIPLE CAVITY TUNING OF A TRANSMITTER OUTPUT IN A COMMUNICATION SYSTEM

This is a division of application Ser. No. 07/907,981, filed on Jul. 2, 1992, now U.S. Pat. No. 5,263,047.

FIELD OF THE INVENTION

The invention relates generally to communication systems and more specifically to frequency hopping cellular radiotelephone systems.

BACKGROUND OF THE INVENTION

In communication systems, and more specifically, cellular radiotelephone systems, frequency hopping is used to increase subscriber capacity by reducing overall system interference. One such frequency hopping technique, fast-synthesizer frequency hopping, is useful to realize small increases in subscriber capacity. Fast-synthesizer frequency hopping allows a single transmitter to hop over an arbitrary number of frequencies. To provide multiple carriers in a cell (i.e., an increase in subscriber capacity), signals transmitted at a transmitter's output are combined utilizing wideband hybrid combiners. Unfortunately, these wideband hybrid combiners provide at least 3 dB of loss per stage of combining. Consequently, power loss of a signal transmitted by a transmitter increases with the number of channels provided.

Another frequency hopping technique used for high capacity applications is baseband frequency hopping. Baseband frequency hopping is useful to realize large increase in subscriber capacity. In baseband frequency hopping, fixed-frequency transmitters (i.e., transmitters that do not fast-synthesizer frequency hop) are interconnected to antennas through frequency-selective cavities to achieve low-loss combining of signals transmitted by the transmitters. Frequency hopping is achieved by distributing baseband information to all the transmitters with appropriate synchronization. Unfortunately, the number of hopping frequencies is limited to the member of fixed-frequency transmitters employed.

Thus, a need exists for an economical means to hop over a member of frequencies to yield a mid-range subscriber capacity increase, yet still mitigate power loss of a signal transmitted.

SUMMARY OF THE INVENTION

A base-site in a communication system comprises a transmitter for transmitting variable frequencies signals at an output, and at least first and second cavities tuned to first and second frequencies respectively, the first and second cavities each having as input the output of the transmitter and having an output coupled to a common antenna.

DETAILED DESCRIPTION OF A PREFERRED EMBODIMENT

Figure 1:
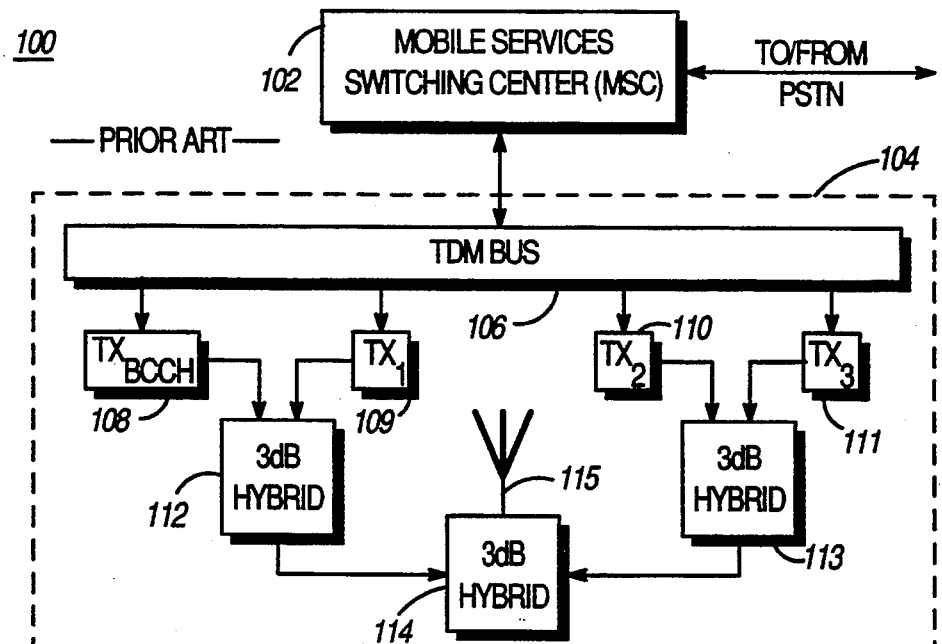
FIG. 1 generally depicts a base-site which implements fast-synthesizer frequency hopping.

FIG. 1 generally depicts a communications system 100 implementing a base-site 104 which performs fast-synthesizer frequency hopping. As depicted in FIG. 1, a Mobile Services switching Center (MSC 102), couples base-site 104 to a Public Switched Telephone Network (PSTN). MSC 102 is coupled to a plurality of transmitters 108–111 via a time-division multiplexed (TDM) bus 106. TDM bus 106 is well understood in the art, and may be of the type described in U.S. Pat. No. 5,081,641, having as inventors Kotzin et al. Continuing, transmitters 108–111 are time-division multiple access (TDMA) transmitters, having performance characteristics described in GSM Recommendation 5.05, Version 3.11.0, published March, 1990. Output from transmitters 108–111 are input into 3 dB wideband hybrid combiners 112–114 which provide wideband frequency combining of signals transmitted by transmitters 108–111. In the preferred embodiment, transmitters 108–111 transmit signals having frequencies in the range of 935 MHz to 960 MHz. Consequently, 3 dB hybrid combiners 112–114 are able to combine signals having frequencies within that range. Combined signals exiting 3 dB hybrid combiner 114 are eventually transmitted to subscribers (not shown) via a common antenna 115.

During fast-synthesizer frequency hopping, TDM bus 106 provides a medium in which packetized information (within timeslots of the TDMA system) are distributed from MSC 102 to transmitters 108–111 for transmission. Transmitters 108–111 receive the packetized information, and transmit at a predetermined frequency during a particular timeslot. In a subsequent timeslot, a particular transmitter, for example transmitter 108 would transmit at one frequency to a subscriber during a timeslot then transmit at a different frequency, to either the same or a different subscriber, during a subsequent timeslot. As is clear to one of ordinary skill in the art, transmitters 108–111 continuously change frequency, or frequency hop, from timeslot-to-timeslot.

Base-site 104 of FIG. 1 provides adequate performance when small subscriber capacity increases are required. For purposes of example, base-site 104 of FIG. 1 is depicted as prodding three different carriers (frequencies) of capacity (in addition to a broadcast channel (BCCH) carrier frequency which does not frequency hop). As is obvious to one of ordinary skill in the art, this configuration would work over any number of different carriers. In this configuration, however, each frequency transmitted by transmitters 109–111 will experience at least 6 dB of loss due to combiners 112–114. Since transmitters 109–111 experience such a severe loss in transmitter power, the physical size of the cell, or coverage area, to which transmitters 109–111 serve is effectively decreased. This in turn minimizes capacity per coverage area, which essentially offsets the capacity gains realized by the fast-synthesizer frequency hopping configuration depicted in FIG. 1.

Figure 2:
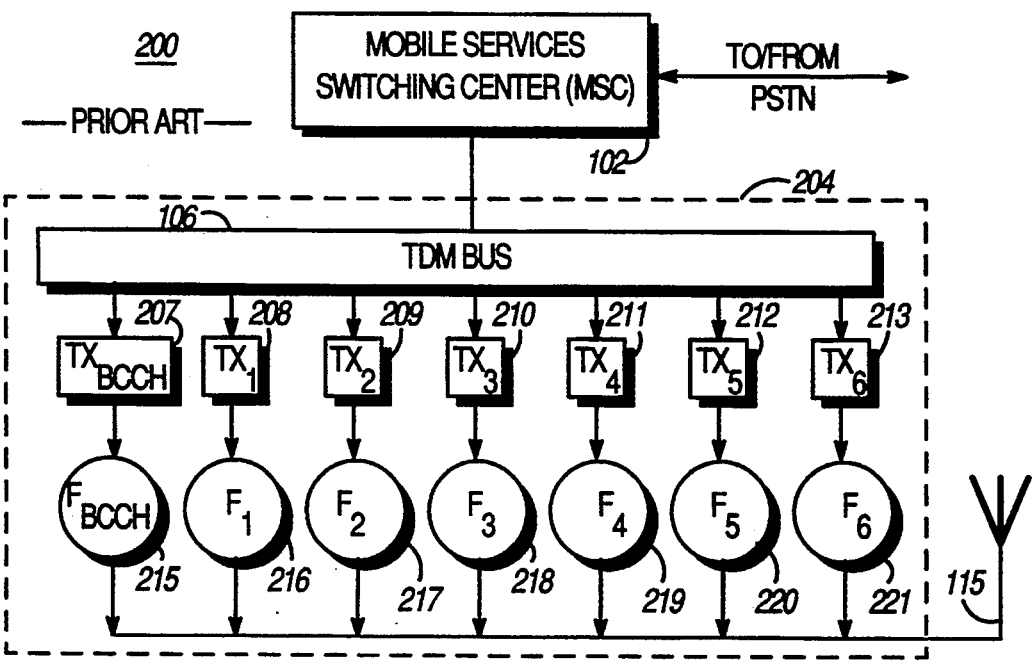
FIG. 2 generally depicts a base-site which implements baseband frequency hopping.

FIG. 2 generally depicts a base-site 204 which implements baseband frequency hopping. As depicted in FIG. 2, MSC 102 and TDM bus 106 may be similar as those depicted in FIG. 1. Also, coupled to TDM bus 106 are transmitters 207-213. In keeping consistent with the example described above for FIG. 1, base-site 204 is required to hop over at least six frequencies. Therefore, six transmitters 208-213, (excluding the BCCH transmitter 207) and six frequency responsive means, which in the preferred embodiment are frequency-selective cavities 216-221 (excluding frequency-selective cavity 215 for the BCCH frequency), are required. Frequency selected cavities 216-221 are tuned to predetermined frequencies $F_1-F_6$ before installation into a cell-site. Consequently, transmitters 208-213 can only transmit signals having frequencies $F_1-F_6$ respectively. If transmitters 208-213 transmit any other frequency other than $F_1-F_6$ respectively, frequency-selective cavities 216-221 will reject those signals.

To implement baseband frequency hopping with base-site 204, packetized information sent from MSC 102 to TDM bus 106 is synchronized and routed to the appropriate transmitter 208-213 for transmission via common antenna 115. Transmitters 208-213, during baseband frequency hopping, do not change frequencies; each transmitter 208-213 is fixed to the predetermined frequency $F_1-F_6$ to which frequency-selective cavities 216-221 are tuned. Baseband frequency hopping occurs when the packetized information which is routed to different transmitters 208-213 contains information for a single subscriber. For example, baseband information received from a particular transmitter, say transmitter 208, may be intended for a particular subscriber during a particular timeslot. In a subsequent timeslot, packetized information received by a different transmitter, say transmitter 209, may be intended for the same subscriber. As this process continues, transmitters 208-213, while each staying on a fixed frequency, take turns (during successive timeslots) transmitting information to a particular subscriber. Obviously, a hopping pattern may be determined so that many more than one subscriber at a time is served. However, the use of six separate transmitters 208-213 to perform baseband frequency hopping is an extremely costly solution to frequency hopping over only six frequencies.

Figure 3:
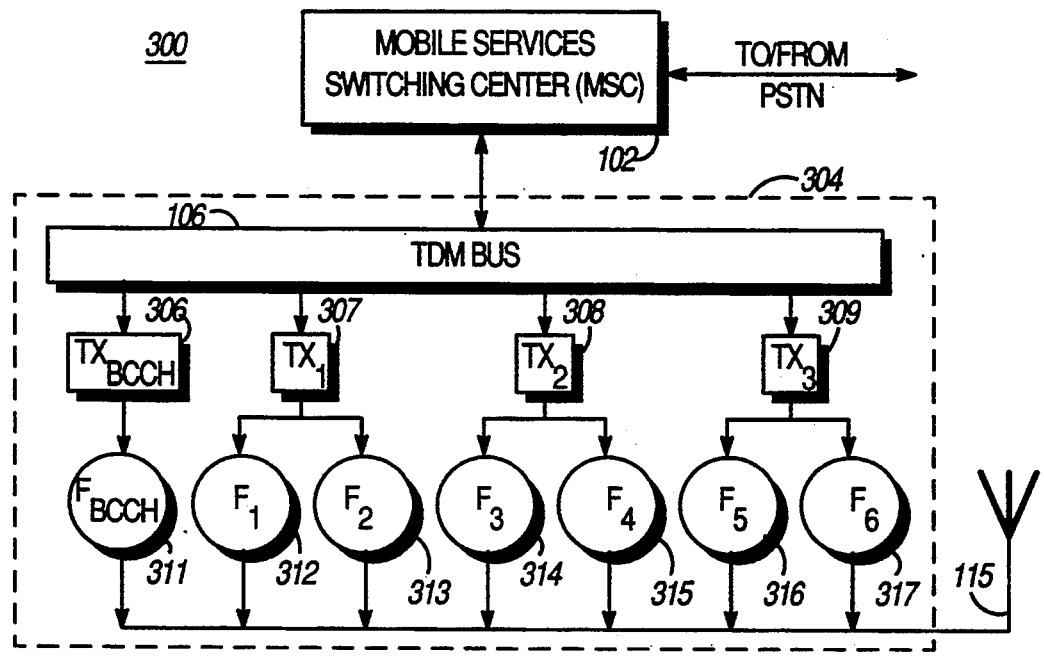
FIG. 3 generally depicts a base-site which implements economical frequency hopping for mid-range capacity which mitigates transmitter power loss in accordance with the invention.

FIG. 3 generally depicts a base-site 304 which implements economical frequency hopping for mid-range subscriber capacity increase which mitigates the power loss of a signal transmitted in accordance with the invention. As depicted in FIG. 3, MSC 102 and TDM bus 106 are similar to those depicted in FIGS. 1 and 2. Also depicted in FIG. 3 are transmitters 306-309 and frequency-selective cavities 311-317. Transmitters 306-309 are each capable of transmitting variable frequency signals at their output. As can be seen, only three transmitters 307-309 are used in conjunction with six frequency-selective cavities 312-317 to provide frequency hopping over six different frequencies. Obviously, by incorporating more frequency-selective cavities per transmitter, more frequencies can be hopped over. Each transmitter 307-309 has its output input to a set of frequency-selective cavities 312-313, 314-315, and 316-317 respectively. Each frequency-selective cavity in the set of frequency-selective cavities are tuned to first and second predetermined frequencies and have an output coupled to common antenna 115. To provide frequency hopping in accordance with the invention, each transmitter 307-309 transmits a signal at a predetermined frequency such that no common predetermined frequencies are transmitted via common antenna 115 at the same time.

Frequency hopping in the communication system 300 of FIG. 3 is performed as follows. Each transmitter 307-309 is capable of fast-synthesizer frequency hopping utilizing a synthesizer which is capable of generating the required output frequency from timeslot-to-timeslot. For example, transmitter 307 is capable of switching frequencies between $F_1$ and $F_2$ from timeslot-to-timeslot. When packetized information is sent to transmitter 307, transmitter 307 transmits at either $F_1$ or $F_2$, but never both simultaneously. This same process occurs for transmitters 308, 309, and however many other transmitters may be employed in the communication system 300). In a subsequent timeslot, packetized information enters transmitter 307 and a message within the packetized information instructs transmitter 307 to transmit a signal at $F_2$ during that subsequent timeslot. Depending on the hopping pattern, transmitter 307 may hop between frequencies $F_1$ and $F_2$, or may simply stay tuned to $F_1$ and $F_2$ depending on the frequency hopping requirements of communication system 300.

Figure 4:
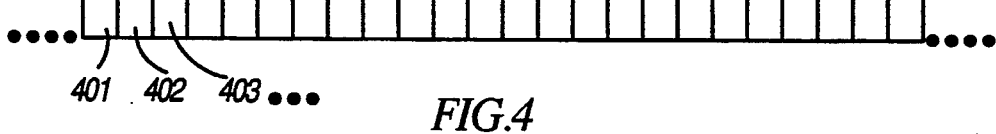
FIG. 4 generally depicts how transmission of frequencies F1–F6 are distributed for three subscribers in accordance with the invention.

FIG. 4 generally depicts how transmission of frequency $F_1-F_6$ are distributed for transmission to three subscribers in accordance with the invention. In the preferred embodiment, each transmitter 307-309 transmits a carrier which comprises 8 timeslots to serve up to eight different subscribers. Obviously, more than 24 subscribers (8 timeslots × 3 transmitters in this example) may be served at any one time by communication system 300, with the only requirement that more transmitters be added to the system; however, there is no real limit to the number of frequency-selective cavities that may be coupled to the output of a particular transmitter 307-309. The advantage of communication system 300 depicted in FIG. 3 is that an increase in capacity can be realized over communication system 100 of FIG. 1 while maintaining the required/desired power level output from transmitters 307-309. Frequency-selective cavities 312-317 are low-loss cavities which do not present a 3 dB loss to a signal that is transmitted. Since frequency-selective cavities are low-loss, base-site 304 of FIG. 3 may incorporate transmitters 307-309 coupled to more than two frequency-selective cavities in a particular set of frequency-selective cavities.

Returning to FIG. 4, there is depicted one of many hopping sequences which may be used to serve, for example three subscribers, with a frequency-hopped transmission in accordance with the invention. As depicted in FIG. 4, subscribers 1, 2, and 3 are shown having a series of transmissions $F_1-F_6$ as seen by subscribers 1, 2, and 3. For example, in a synchronized timeslot (a timeslot in which each subscriber 1, 2, and 3 would each see a common transmission) such as timeslot 401, subscriber 1 would be served by transmitter 307 via frequency-selective cavity 312 at a frequency of $F_1$. During the same timeslot (not physically the same timeslot; same in that they are synchronized), the second subscriber, subscriber 2, would be served by transmitter 308 via frequency-selective cavity 313 at a frequency $F_3$. Likewise, subscriber 3 would be served by transmitter 309 via frequency-selective cavity 316 at a frequency $F_5$. In a subsequent timeslot 402, transmitters 307-309 would fast-synthesizer frequency hop to the other predetermined frequency in the set of set of predetermined frequencies (for example, transmitter 307 would frequency hop to $F_2$ out of the set of $F_1$ and $F_2$). Consequently, during timeslot 402, subscriber 1 would be served by transmitter 307 via frequency-selective cavity 313 at a frequency $F_2$, subscriber 2 served by transmitter 308 via frequency-selective cavity 313 at a frequency $F_4$, and subscriber 3 served by transmitter 309 via frequency-selective cavity 317 at a frequency $F_6$. During the transition from timeslot 402 to timeslot 403, base-site 304 would baseband frequency hop such that each transmitter 307–309 would serve a different subscriber than the previous two timeslots. For example, during timeslot 403, subscriber 1 would be served by transmitter 308 via frequency-selective cavity 314 and a frequency $F_3$. Likewise, subscriber 2 would be served by transmitter 309 via frequency-selective cavity 316 at a frequency $F_5$, and subscriber 3 would now be served by transmitter 307 via frequency-selective cavity 312 at a frequency $F_1$.

Significant to note is that FIG. 4 illustrates the necessity for the baseband information distribution capability. That is, a subscribers information is required at all transmitters. Also note that at no time is $F_1$ on with $F_2$, $F_3$ with $F_4$, or $F_5$ with $F_6$. This is necessary since only one transmitter is provided for the set of predetermined frequencies.

Figure 5:
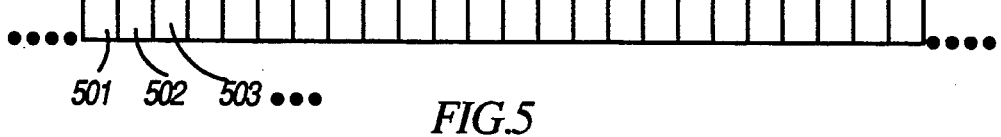
FIG. 5 generally depicts how frequencies F1–F6 and a dedicated broadcast control channel (BCCH) frequency are distributed for three subscribers in accordance with the invention.

As depicted in FIG. 3, the BCCH transmitter 306, and the corresponding BCCH frequency-selective cavity 311 are also coupled to common antenna 315. Typically, in TDMA communications systems, such as communication system 300, transmission by BCCH transmitter 306 must occur during a dedicated timeslot. In the preferred embodiment of the GSM digital radiotelephone system, the dedicated timeslot is timeslot zero of a 8-timeslot frame. For more information on the framing structure of the preferred embodiment, reference is made to GSM Recommendation 5.01, Version 3.3.1, published January, 1990. Continuing, in keeping consistent with the above example of hopping over six frequencies, FIG. 5 depicts transmission of a signal at the BCCH frequency, denoted by $F_b$ in FIG. 5, every 7 timeslots. As can be seen, during timeslot 501, subscriber 1 receives the BCCH signal transmitted by BCCH transmitter 306 via frequency-selective cavity 311 at $F_{BCCH}$. Subscriber 2 is served by transmitter 307 via frequency-selective cavity 313 at a frequency $F_2$, while subscriber 3 is served by transmitter 308 via frequency-selective cavity 315 at frequency $F_4$. As is apparent to one of ordinary skill in the art, subsequent timeslots 502, 503, and others serve subscribers 1, 2 and 3 via the combination of baseband frequency hopping and fast-synthesizer frequency hopping as described above. Again, significant to note is that the paring rule described above (between each frequency-selective cavity in the set of frequency-selective cavities) is never violated. In this manner, the elements of baseband frequency hopping and fast-synthesizer frequency hopping are combined to provide a economical (the number of transmitters cut in half) solution to frequency hopping without affecting the power level (absence of 3 dB hybrid combiners) of a signal transmitted by transmitters 307–309.

Thus, it will be apparent to one skilled in the art that there has been provided in accordance with the invention, a method and apparatus for providing multiple cavity tuning of a transmitter output in a communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What we claim is:

1. A base-site in a communication system, comprising:
   a transmitter for transmitting variable frequency signals at an output; and
   at least first and second cavities tuned to first and second frequencies respectively, the first and second cavities each having as input the output of the transmitter and having an output coupled to a common antenna.

2. The base-site of claim 1 wherein the transmitter for transmitting variable frequency signals further comprises a transmitter for transmitting signals at the first and second frequencies of the fixed-frequency cavities.

3. The base-site of claim 2 wherein the transmitter for transmitting signals at the first and second frequencies of the fixed-frequency cavities further comprises a transmitter for transmitting a signal at either the first or the second frequency at a time.

4. A transmission system comprising:
   a transmitter for transmitting variable frequency signals at an output; and
   first and second cavities, coupled to the output of said transmitter and tuned to first and second frequencies respectively, said first and second cavaties each having an output coupled to a common antenna.

5. The transmission system of claim 4 wherein the transmitter for transmitting variable frequency signals further comprises a transmitter for transmitting signals at the first and second frequencies of the tuned cavity.

6. The transmission system of claim 5 wherein the transmitter for transmitting signals at the first and second frequencies of the tuned cavity further comprises a transmitter for transmitting a signal at either the first or the second frequency at a time.

7. A base-site in a communication system, the base-site transmitting signals at first and second frequencies, the base-site comprising:
   a transmitter for transmitting variable frequency signals at an output; and
   first and second frequency responsive means, coupled to the output of said transmitter, for frequency-tuning signals transmitted at said first and second frequencies, said first and second frequency responsive means each having an output coupled to a common antenna.

8. The base-site of claim 7 wherein said transmitter transmits said variable frequency signals such that said signals transmitted at said first and second frequencies are not simultaneously transmitted via the common antenna.

9. The base-site of claim 7 wherein said base-site is a time division multiple access (TDMA) base-site.

10. The base-site of claim 9 wherein said transmitter for transmitting variable frequency signals at an output further comprises a transmitter for transmitting variable frequency signals at an output during a TDMA timeslot.

11. The base-site of claim 8 wherein said transmitter for transmitting variable frequency signals at an output during a TDMA timeslot further comprises a transmitter for transmitting signals at first and second frequencies such that said signals are not simultaneously transmitted during the same TDMA timeslot.

12. A method of transmission in a communication system, the method comprising the steps of:
   transmitting, via a transmitter, variable frequency signals; and
   frequency-tuning, via first and second frequency responsive means having outputs coupled to a common antenna, signals transmitted at first and second frequencies for transmission.

13. The method of claim 12 wherein said step of frequency-tuning signals transmitted at first and second frequencies for transmission further comprises the step of frequency-tuning signals transmitted at first and second frequencies for transmission via the common antenna.

14. The method of claim 12 wherein said step of transmitting variable frequency signals further comprises transmitting signals at first and second frequencies such that said signals are not simultaneously transmitted.

15. The method of claim 12 wherein said communication system is a time division multiple access (TDMA) communication system.

16. The method of claim 15 wherein said step of transmitting variable frequency signals further comprises the step of transmitting variable frequency signals during a TDMA timeslot.

17. The method of claim 16 wherein said step of transmitting variable frequency signals during a TDMA timeslot further comprises the step of transmitting signals at first and second frequencies such that said signals are not simultaneously transmitted during the same TDMA timeslot.

* * * * *